Mar. 27, 1923.

E. A. MARGESON ET AL.
AUTOMATIC MULTIPLE SWITCH CONTROLLING MACHINE.
FILED MAR. 29, 1920.

INVENTORS.
E.A. Margeson,
C.D. Herrold.
BY Chas. E. Tournent
ATTORNEY.

Mar. 27, 1923.
E. A. MARGESON ET AL.
AUTOMATIC MULTIPLE SWITCH CONTROLLING MACHINE.
FILED MAR. 29, 1920.

INVENTORS.
E. A. Margeson,
C. D. Herrold.
BY Chas. E. Townsend
ATTORNEY.

Mar. 27, 1923.

E. A. MARGESON ET AL.
AUTOMATIC MULTIPLE SWITCH CONTROLLING MACHINE.
FILED MAR. 29, 1920.

INVENTORS.
E. A. Margeson.
C. D. Herrold.
BY Chas. E. Townsend
ATTORNEY

Patented Mar. 27, 1923.

1,449,619

UNITED STATES PATENT OFFICE.

EVERETT A. MARGESON AND CHARLES D. HERROLD, OF SAN JOSE, CALIFORNIA, ASSIGNORS TO GERTRUDE ANNIE MARGESON, OF SAN JOSE, CALIFORNIA.

AUTOMATIC MULTIPLE-SWITCH CONTROLLING MACHINE.

Application filed March 29, 1920. Serial No. 369,780.

*To all whom it may concern:*

Be it known that we, EVERETT A. MARGESON and CHARLES D. HERROLD, citizens of the United States, residing at San Jose, in the county of Santa Clara and State of California, have invented a new and useful Improvement in Automatic Multiple - Switch Controlling Machines, of which the following is a specification.

This invention relates to a combination advertising and indicating machine which is adapted for installation on trains, street cars, etc., for the purpose of indicating street names and stations, and for simultaneously displaying advertisements of varying character, but particularly to an automatic multiple switch controlling machine whereby one or more indicating machines is intermittently and automatically actuated.

One of the objects of the present invention is to provide an automatic multiple switch controlling machine whereby several independent electric circuits may be automatically controlled, and especially to provide a multiple switch controlling machine whereby one or more motor driven street indicating machines may be intermittently and independently operated.

Another object of the invention is to provide a multiple switch controlling machine which embodies a drum, mechanical means for driving the same, a helix on the drum, a series of interspaced projections on the helix, and means actuated by said projections for operating certain switches mounted on the multiple switch controlling machine.

Another object of the invention is to provide means for manually and automatically adjusting the position of the helix carrying drum with relation to the indicating machines and the driving means.

Another object of the invention is to provide an automatic multiple switch controlling machine, in which is mounted a cylinder reversing switch and in conjunction therewith means for automatically reversing the position of said switch when the helix carrying drum has turned a predetermined number of revolutions whether in one direction or another.

Another object of the invention is to provide an automatic reversible driving connection between the helix supporting drum and the mechanical drive.

Further objects will hereinafter appear.

The invention consists of the parts and the construction, combination and arrangement of parts as hereinafter more fully described and claimed, having reference to the accompanying drawings, in which—

Figure 1:
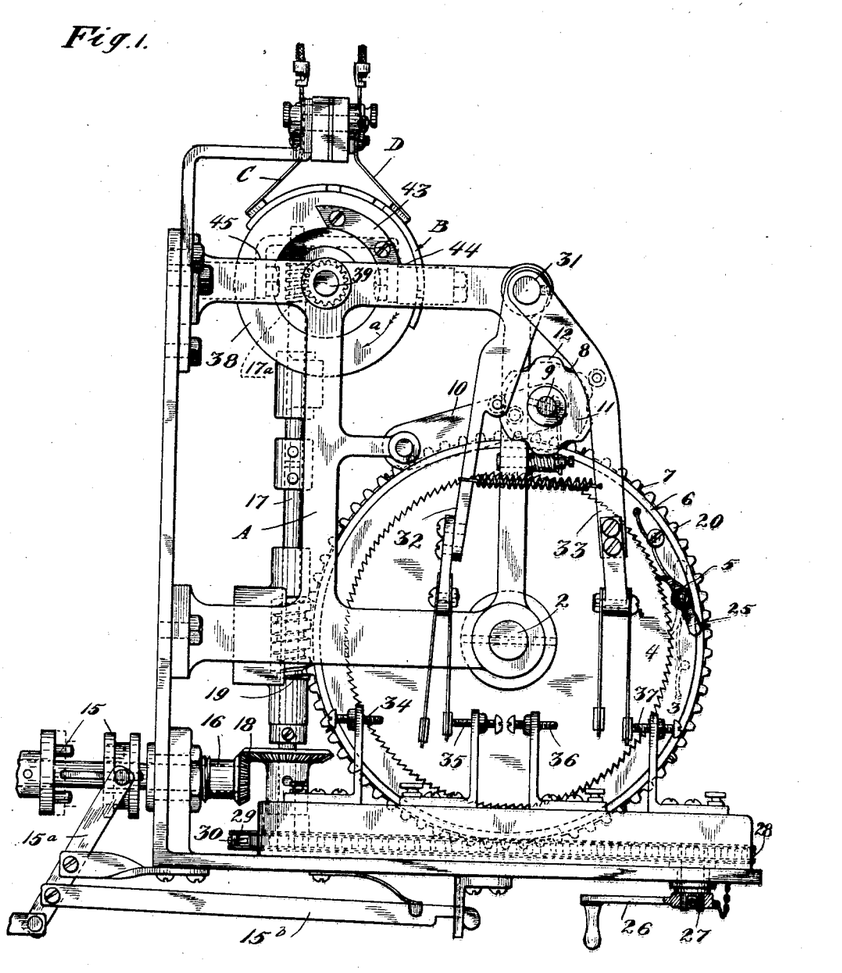
Fig. 1 is a side elevation of the automatic multiple switch controlling machine.
Figure 2:
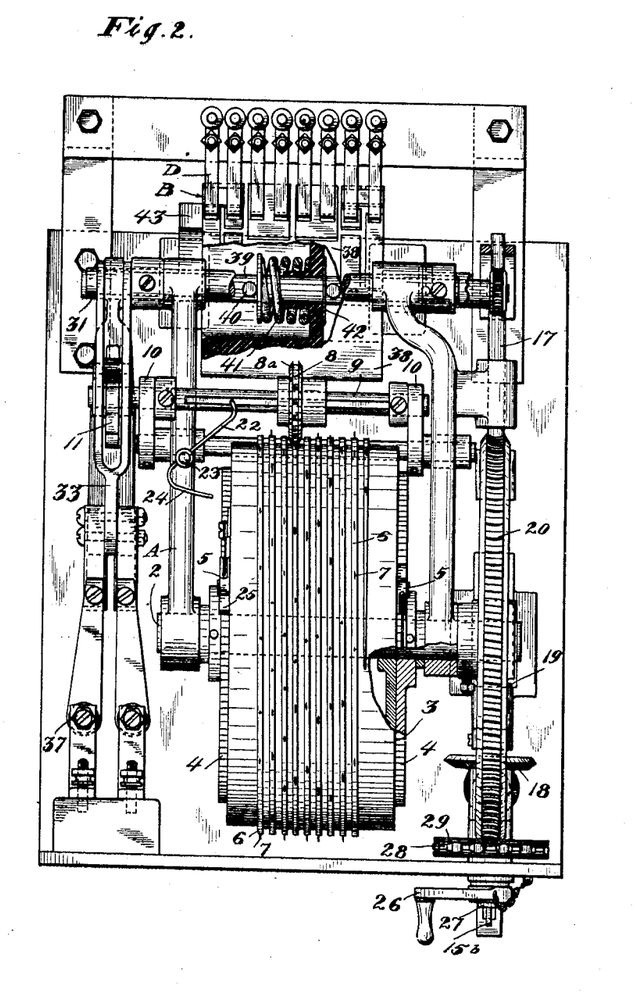
Fig. 2 is a front view of the same, partially broken away and partially in section.
Figure 5:
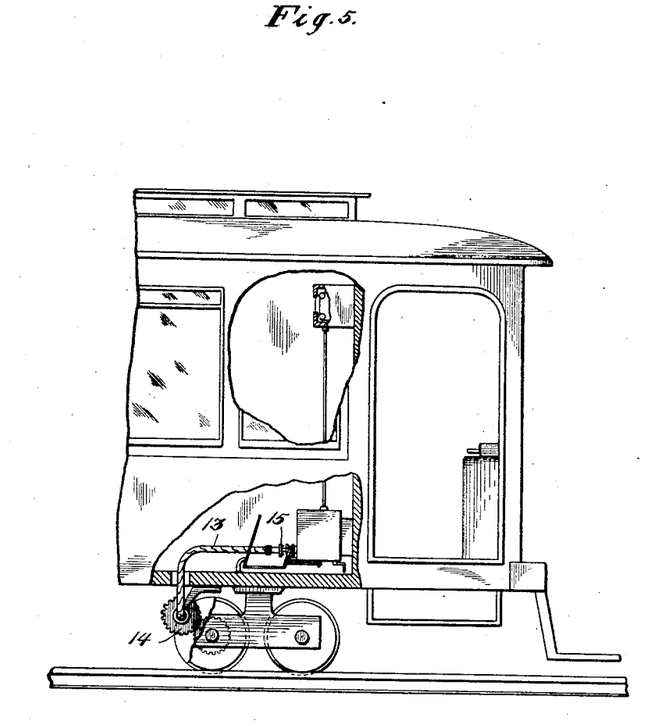
Fig. 5 is a partial side elevation of a street car, showing the application of the invention.

Referring to the drawings in detail, and particularly to Figs. 1 and 2, which are the drawings of the automatic multiple switch controlling machine, A indicates a main frame of suitable construction, in which is journaled a shaft 2. Turnably mounted on the shaft is a drum 3, and keyed to the shaft or otherwise secured thereto is a pair of rack gears, 4, one on each end of the drum. The rack gears are right and left hand, or in other words, reversed with relation to each other, and both gears are engaged by pawls 5, which are carried by the drum. Formed on the outer face of the drum is a thread or helix 6, and projecting from the face of the helix are pins or projections 7 which are adapted to intermittently rotate a pin gear 8 which is keyed but slidably mounted on a shaft 9. This shaft is supported in journal members 10 above the drum, and secured on one end of the shaft is a wheel 11, on which is formed six cam projections such as indicated at 12. There are twelve pins on the pin gear 8, and a twelfth of a revolution is therefore transmitted to the pin gear and the shaft 9, together with the cam wheel 11 when the pin gear is engaged by a projection 7 carried by the helix. The shaft 2, together with the gears 4, and the drum 3, are mechanically driven. The drive provided consists of a flexible shaft 13, which is positively driven from the car wheels by means of the gears 14. (See Fig. 5.) Turning movement imparted to the flexible shaft is transmitted through a jaw or a pin clutch such as shown at 15 to a shaft 16 and from this shaft to a vertically disposed shaft 17, which is journalled in the main frame A through a bevel gear train such as shown at 18. Secured on the shaft 17 is a worm 19, and intermeshing therewith and secured on one end of the shaft 2 is a worm gear 20. In other words a positive driving connection is formed between the car wheels and the shaft 2, the speed of the shaft 2 being however materially lessened due to the gear reduction provided by the bevel gears 18 and the worm gears 19 and 20. The reduced speed transmitted to the shaft 2 is again transmitted to the drum 3 through one or another of the rack gears 4 and the pawls 5, the driving connection formed depending upon the direction of rotation, that is one pawl and rack will drive the drum in one direction and the opposite pawl and rack in the opposite direction. The pin gear 8 is flanged as shown at $8^a$ to embrace the thread or helix 7. It is therefore obvious that rotation of the drum will impart a sliding movement to the pin gear. This movement is utilized to automatically break the driving connection between the rack gears 4 and the pawls 5. For instance, by referring to Fig. 2, it will be seen that a crank arm 22 is pivotally secured to the main frame A as at 23. The upper end of this crank arm is engaged by the pin gear 8 when it has travelled a predetermined distance along the shaft 9. A rocking movement will thus be transmitted to the crank arm 22, causing its upper end to swing upwardly and its lower end 24 inwardly. This will cause the lower end 24 to assume a position in alignment with the adjacent or cooperating pawl 5, and as this is provided with a raised cam projection 25 (see Fig. 1.) it is obvious that passage of the pawl under the arm 24 will cause depression of the cam end of the pawl and raising of its opposite engaging end, thus freeing the pawl with relation to the cooperating rack gear and automatically breaking the driving connection. This automatic break between the drum and one or the other of its driving connections is necessary. For instance, if a car is travelling on a certain run and steep hills or slippery weather is encountered, it is possible that the car wheels will slip while the drum continues rotating. This is objectionable as it throws the drum or the pins carried on the helix out of time with the car, or in other words, causes streets to be announced or displayed before their proper sequence as will hereinafter be described. Slippage of the car wheels will under all conditions cause the drum to advance and it will therefore cause it to display the street names too early. In fact slippage might take place to such an extent as to display a street two or three blocks ahead of the time of reaching the same. It is therefore obvious that the drum will turn its predetermined number of revolutions before the end of the run is reached and that to correct the slippage, it is only necessary to automatically disconnect the driving connection between the gears 4 and the drum. With the driving connection automatically broken by means of the crank arm 22, it is possible for shaft 2 to turn without transmitting further movement to the drum. The drum therefore remains stationary until the car reaches the end of its run and any slippage that may have taken place is thus corrected as the car will now be reversed and will travel in the opposite direction.

Manually actuated means has also been provided for correcting the position of the drum. This is accomplished by first throwing out the pin clutch 15, for instance by means of a rocker arm $15^a$ and a connecting lever $15^b$. A hand crank 26 is then grasped and rotated in the direction desired. This hand crank is secured on a shaft 27, journalled in the base of the main frame and this shaft in turn carries a sprocket gear 28, which transmits rotation to the shaft 17 through means of a chain 29 and a sprocket gear 30 secured on the lower most end of shaft 17. This permits the drum to be turned until the correct street is indicated and is only used when the car is side-tracked for some reason or another or possibly after having traversed another route. It may of course be rendered entirely inoperable under these conditions by disconnecting the clutch 15.

The construction of the drum, the mounting and driving of the same, and the means for adjusting or correcting its position has now been described, and it is therefore thought that the function of the cam wheel 11 should follow. This wheel, as previously stated, is provided with six cams 12 and is intermittently rotated one-twelfth of a revolution. Pivotally attached to the main frame, as at 31, at a point above the shaft 9, is a pair of switch arms indicated by numerals 32 and 33. The switch 32 makes and breaks circuits hereinafter to be described between the double contacts 34 and 35, while the switch arm 33 makes and breaks circuits between the double contacts 36 and 37. The switches 32 and 33 will hereinafter be known as the master switches and the circuits established or broken thereby will further be described. The switch arms 32 and 33 are moved from one position to another by means of the cams 12 and as these only turn one-twelfth of a revolution when actuated, it is obvious that the switch arm 32 will either engage the contacts 35, for instance when resting in a recess of the cam 12, and that it will contact with the terminals 34 when engaged by a cam. The operation of the switch arm 33 is similar, and as the switch arms are opposite to each other they will simultaneously move in one direction or another, thus engaging the double contacts 35 and 37 in unison, or the double contacts 34 and 36 in unison. The whole function of the drum and the driving connections provided therefor is to intermittently change the position of the master switches 32 and 33. The machine is however provided with a reversing switch which cooperates with the switches 32 and 33, and also with other switches to be hereinafter described. This switch is generally indicated at B. It consists of a drum 38, which is supported by a shaft 39. This shaft is continuously rotated from shaft 17 by means of a worm gear drive 17ª, but rotary movement is only transmitted to the drum whenever the street car starts back at the end of its run. This is accomplished as follows:

Secured interior of the drum on the shaft 39 is a pin 40, and interposed between the pin and the end of the drum is a coil spring 41, which holds the drum in frictional engagement with a collar 42 secured on the shaft. A friction drive or connection is thus formed between the drum and the shaft which becomes operable to turn the drum one-fourth of a revolution whenever the direction of rotation of shaft 17 is reversed. This will be more easily understood when it is stated that a segment-like lug 43 is secured on one end of the drum which is adapted to engage the upper portion of the frame at the points indicated at 44 and 45. For instance if the shaft 17 is turning in a direction which would cause the friction drive formed between shaft 39 and the collar 42 to turn in the direction of arrow $a$, (see Fig. 1.) then drum 38 will rotate until the stop segment 43 engages the point or stop 44 formed by the frame. If the direction of shaft 17 is reversed, then it is obvious that the rotation of shaft 39 will be reversed and that the friction drive will thus cause the drum to revolve in a direction opposite to arrow $a$ and it will revolve in this direction until the segment 43 engages the point of the main frame indicated at 45. An approximate one-fourth of a revolution is thus automatically transmitted to the reversing switch drum whenever the direction of rotation of shaft 17 is changed and as the direction of rotation of shaft 17 is only changed when the car is reversed, it can readily be seen that the reversing drum or switch only changes its position at each end of a given route or run, or at intermediate points.

Figure 6:
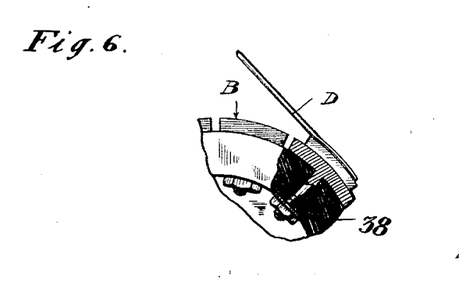
Fig. 6 is an enlarged detail sectional view of the reversing switch drum.

The function of the reversing switch and its cooperation with the master switches 32 and 33 will hereinafter be described. It may, however, be stated that the drum is constructed of insulating material such as shown in Fig. 6 and that it carries in all twenty-two segments which are insulated therefrom. These segments are more clearly illustrated in Fig. 7 and will hereinafter be referred to by reference numerals. The segments are engaged by sixteen separate spring actuated contacts, their being eight on each side of the main frame as indicated at C and D.

Figure 3:
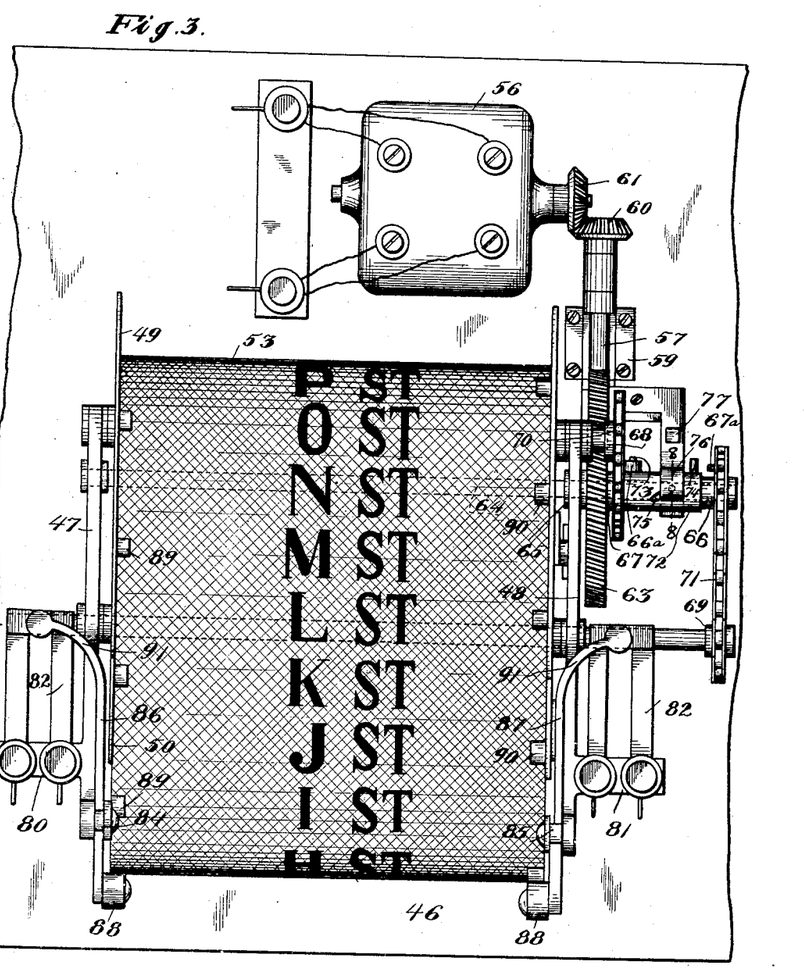
Fig. 3 is a plan view of the indicating machine.
Figure 4:
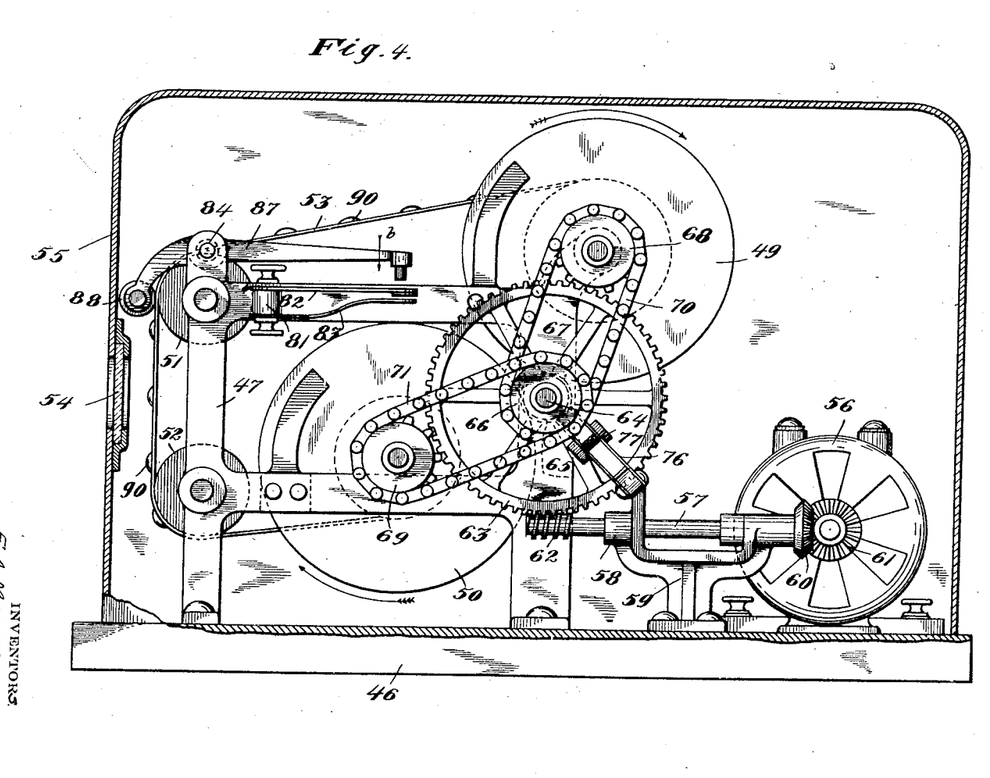
Fig. 4 is a side elevation of the same.

To fully understand the operation of the automatic multiple switch controlling machine, it is thought necessary to give a brief description of the indicating machines and the switches controlled thereby. The indicating machine is illustrated in Figs. 3 and 4 and is constructed as follows:

46 indicates a base plate on which is secured a pair of frame sections 47 and 48. Suitably journalled in said frame are a pair of rollers 49 and 50 and a pair of idlers 51 and 52. 53 indicates a belt constructed of any suitable material such as paper or fabric. This belt is carried by the rollers 49 and 50 and is guided by the idlers 51 and 52. One end of this belt is secured to the roller 49 and the opposite end to the roller 50. The rollers will therefore alternately serve as drivers and receivers and as the belt has street or station names printed or otherwise formed thereon, it is obvious that an intermittent movement must be transmitted to the rollers and the belt carried thereby to permit each name to be successively displayed through an opening 54, which is formed in a casing 55 enclosing the entire mechanism.

The rollers 49 and 50 are in this instance driven by means of an electric motor 56 and this drive can be traced as follows:

57 indicates a horizontally positioned shaft which is journalled as at 58 in a bracket member 59 secured upon the base. Secured on one end of the shaft is a bevel gear 60 which intermeshes with a similar gear 61 upon the motor shaft, and secured to the opposite end of the shaft 57 is a worm gear 62 which intermeshes with a worm wheel 63. The gear 63 is secured on a shaft 64 and this is in turn journalled in the main frame as indicated at 65. Loosely mounted on the shaft 64 is a pair of sprocket wheels 66 and 67 and connecting said sprockets with a pair of sprockets 68 and 69 are endless driving chains 71 and 70. The respective chains and sprockets are provided for the purpose of driving one or another of the belt supporting rolls 49 and 50 and this is accomplished as follows:

Suitably secured on the inner faces of the sprockets 66 and 67 are pins 66ᵃ and 67ᵃ. Turnably mounted on the shaft 64, intermediate the sprockets 66 and 67, is a clutch member 72 and projecting from either end of said clutch and radially with relation thereto are pins 73 and 74. The clutch 72 consists of a sleeve in which is cut an angularly positioned slot 75. Secured to shaft 64 and projecting through said slot is a pin 75ᵃ, and surrounding the sleeve and frictionally engaging the same is a pair of friction clamp arms 76, the tension of which may be regulated by a screw 77.

The motor 56 is of the series wound type and is reversible and is therefore capable of transmitting power to shaft 57 in either direction. A drive transmitted through gears 60, 61, 62 and 63 in one direction will first cause the pin 75ᵃ to travel from one end of slot 75, formed in the clutch sleeve, to the other. This causes the sleeve to move lengthwise of the shaft 64, pulling pin 74 into engagement with pin 66ᵃ on sprocket 66. The longitudinal movement of the sleeve takes place while pin 75ᵃ travels from one end of the slot to the other, sleeve 72 being prevented from rotating at this moment for the simple reason that it is held against rotary movement by the spring actuated clamp arms. The frictional engagement of said arms is however not sufficient to hold the sleeve against rotation when pin 75ᵃ reaches the opposite end of the slot.

Power will therefore be transmitted through shaft 64, pins 75ᵃ, sleeve 72, and pins 73 and 66ᵃ, to sprocket 66, which in turn transmits power through chain 70 to the sprocket 68 and the roller 49. The belt 53 will thus unwind with relation to roller 50 and will pass over the idlers 51 and 52 to the roller 49 upon which it is wound, the sprocket 67 being loosely mounted on the shaft 64 will in this instance act as an idler and will otherwise be inactive as far as transmitting power is concerned, this being of course true only when power is being transmitted to the roller 49. If the direction of rotation of the motor is reversed it should be obvious that pin 75 will immediately travel to the opposite end of the slot and thereby force the sleeve 72 longitudinally into engagement with the sprocket 67. Power will then be transmitted through shaft 64, pins 74 and 67ᵃ, to the sprocket 67 and through chain 71 power will be transmitted to sprocket 69 and the roller 50 driven thereby. The direction of travel of the belt 53 will thus be reversed and will wind itself about the roller 50 and will simultaneously unwind with relation to the roller 49.

The reversible motor together with the automatic clutch indicated at 72 makes it possible to drive the belt in either direction. This is of great importance when the indicator is employed in street car service as it is necessary to drive the belt in one direction when the car is travelling in one direction and it will consequently be necessary to reverse the travel of the belt when the car is returning. The reversing of the motor is automatically accomplished by the multiple switch controlling machine previously described and means have also been provided for automatically opening and closing the circuits of the motor to produce or transmit an intermittent drive through the belt 53 whether this be travelling in one direction or another. This is accomplished in the following manner:

By referring to Figs. 3 and 4, it can be seen that the names of the streets are printed or otherwise applied to the surface of the belt. Each street name is brought into register with the display opening or window 54, formed in the front of the casing 55, and means have been provided for automatically stopping the belt and motor the moment a street name is brought into register with said window. 80 and 81 indicate in general a pair of switches. They are operated by the belt 53 through the following means: Each switch consists of a pair of spring contact members 82 and 83, and pivotally mounted on the main frame as at 84 and 85 is a pair of rocker arms 86 and 87, one for each switch. Suitably secured to the outer end of each lever arm is a roller 88, and secured on the opposite edges of the belt are a plurality of raised buttons or projections 89 and 90, the projections 89 being so positioned as to engage with the roller on arm 86, while the projections 90 will engage with the roller on the arm 87. There is one projection for each street and name, and these are staggered with relation to each other, that is projection 89 which registers with M Street (see Fig. 3) is offset with relation to projection 90 on the opposite side of the belt, which registers with N Street, similarly projections 89 which registers with I Street is offset with relation to projection 90 which registers with J Street, etc.

The inner end of each rocker arm is turned outwardly as indicated at 91 to bring the end of the rocker arm directly above the flexible spring contact members of the respective switches 80 and 81, with which they are connected. The operation of this part of the mechanism will be as follows:

Motor 56 having been started will transmit movement to drive the belt 53. The belt moving in a certain direction will consequently bring one of the buttons or projections into engagement with roller 88 on arm 86, and will rock this on the pivot 84, causing the outer end to move downward in the direction of arrow $b$, and force the flexible contacts 82 and 83 of switch 80 into engagement with each other, the buttons 90 on the opposite side of the belt being offset with relation to buttons 89, which are now in register with roller 88, will consequently permit arm 87 to remain in raised position and the contacts 82 and 83 or switch 81 will thus remain in normal or open position.

Figure 7:
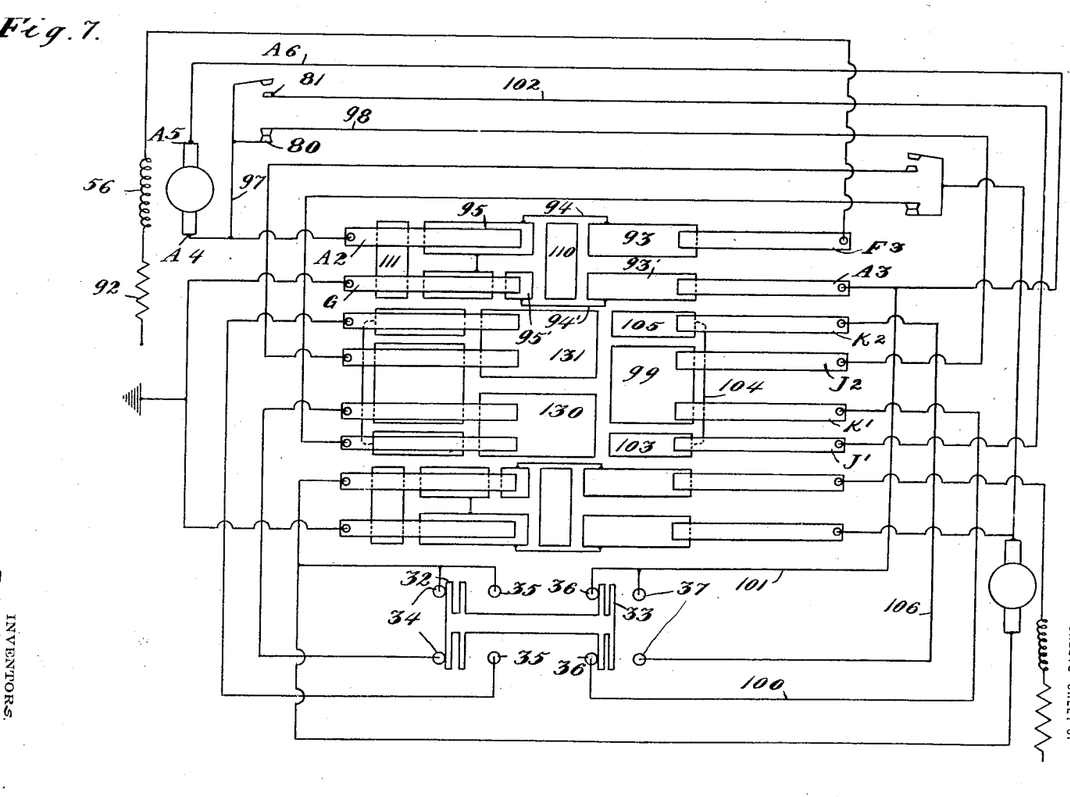
Fig. 7 is a wiring diagram showing the connections formed between the indicating machines and the automatic multiple switch controlling machine.
Figure 8:
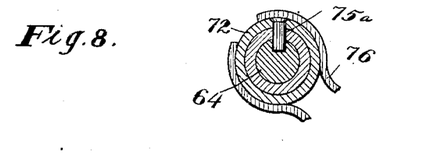
Fig. 8 is an enlarged detail cross section on line 8—8, Fig. 3.

The switches 80 and 81 are automatically opened or closed through means of the buttons or projections 89 and 90 and the arms 86 and 87. These switches are connected in such a manner that they will alternately close a by-pass or shunting circuit around the armature which is automatically opened by the multiple switch controlling machine as will hereinafter be described, having reference to the wiring diagram shown in Fig. 7. This diagram illustrates the connections formed between the indicating machine and the multiple switch controlling machine and in fact illustrates the wiring or connection between two indicating machines, for instance, one at each end of the street car and the multiple switch controlling machine. The circuits between the multiple switch controlling machine and the driving motor of either indicating machine are identical and the description of one series of circuits is therefore thought sufficient. These circuits can be traced as follows:

The automatic multiple switch controlling machine controls six circuits, each of which is reversible, there being three separate circuits for each indicating machine. We will first consider a closed circuit through one of the indicating machine driving motors. The motors employed, as previously described, are series wound. Current coming from the trolley line passes through a resistance 92, next through the field of the motor 56 and then passes through a wire which is connected with a contact $F^3$. The current then passes through a segment 93 on the reversing drum, a bridge wire 94, a segment 95, contact $A^2$, and then reaches one terminal of the armature as at $A^4$. The current then passes upwardly through the armature in the direction of the arrow and out through the terminal $A^5$ and wire $A^6$ which is attached to a contact $A^3$. The current then passes through segment 93', bridge wire 94', segment 95', and finally enters the rail or ground circuit through contact G. This indicates the closed or operating circuit formed through the motor. This circuit of course causes rotation of the armature and power is thereby transmitted to move the street displaying belt. This movement of the belt is however limited at the projections 89 or 90 on the belt are provided for by-passing or shunting the circuit around the armature. This circuit can be traced as follows:

Current from the trolley passes through the resistance 92, the armature field 56, and then passes through a wire which is connected with contact $F^3$, segments 93 and 95, bridge wire 94, and contact $A^2$. Current then is shunted through a wire 97 and the switch 80 of one of the indicating machines. The contacting points of said switch are connected by a wire 98 with a contact $J^2$, which engages segment 99. The current passes through the segment and contact $K^1$, which is connected with one of the terminals of the master switch 33, by means of a wire 100. Current then passes through the terminals of the master switch and wire 101, which is connected with the contact $A^3$. The current then passes through the segments 93', 95', bridge wire 94', and contact G which is connected with the rail or the ground. From this it can be seen that the current is grounded without passing through the armature.

It is well known that shunting or short circuiting of the armature of a motor, the field circuit remaining excited, provides an instantaneous brake for said rotating armature. This is due to the fact that the rotating armature of any direct current motor generates a powerful counter electro-motive force. Shorting the armature sets up a powerful momentary field about the armature which acts as a brake. This condition takes place in the present instance the moment the contacts of the switch are closed as a by-pass or shunting circuit is formed for the current. In other words the current flow through the field still continuous but all flow through the armature is interrupted due to the circuit of less resistance established by the switch 80. Instantaneous stoppage of the armature is therefore produced and similarly the movement of the display belt. While the current is shunted around the armature which remains stationary, it must be remembered that the drum in the multiple switch controlling machine which carries the helix is rotating and that it will throw the master switch when the next street is to be displayed. Operation of the master switch therefore opens the shorting circuit just described, and it also accomplishes one other function, to-wit: that of preparing a second shorting circuit through the contacts 37 on the master switch 33, adapted to be closed by switch 81. The moment the master switch is thrown the current flow through the armature is again established and it is therefore obvious that movement will again be transmitted to the belt by which the street names are successively displayed. Further that the belt will continue moving until the projections thereon actuate switch 81, and thereby completes the shunting circuit prepared by the master switch 33 when it engaged the contacts 37. Movement of the displaying belt will bring projections 90, formed thereon, into position, where one or another of the same will actuate the contacts of the switch 81 and close the circuit through the same. This second shunting being completed, instantaneous stoppage and further revolution of the motor is caused. The second shunting circuit can be traced as follows:

Commencing with the trolley the current again passes through the resistance 92, the motor field 56 and the wire which connects the same with the contact F³. The current then passes through segment 93, bridge 94, segment 95, contact A², wire 97, switch 81, wire 102, contact J¹, segment 103, bridge 104, segment 105, contact K², and wire 106, which connects with the master switch terminals 37. The current then passes through the said terminals and out through wire 101, which is connected with the contact A³, segment 93', bridge 94', contact 95', and contact G, which is connected with the rails or the ground. These are the three main circuits and they are automatically actuated by the multiple switch controlling machine and also by the movement of the display belt in the indicating machine.

The function of the switches 80 and 81 carried by the indicating machine and actuated by the projections on the display belt is to close the shunting circuits established by the master switch 33, and therefore causes instantaneous stoppage of the driving motor 56. The function of the multiple switch controlling machine is in reality that of actuating the master switch 33, which prepares the two shunting circuits described or opens said circuits.

We have other functions to consider, that is the operation of the reversing switch or drum. This drum, as previously stated, is automatically turned approximately one-fourth of a revolution when the car reverses at one end of a predetermined course or run. The functions of the reversing switch or drum is that of automatically reversing the circuits through the motors whereby the indicating machines are driven, that is the street displaying belt travels in one direction when the car is travelling in one direction and it is therefore necessary to reverse its direction of travel when the car returns or reverses its direction of travel. The function of the reversing switch or drum is therefore, first that of automatically reversing the circuits through the motors, and secondly that of reversing the shunting circuits which circuits in turn are controlled by the belt actuated switches 80 and 81, and the double master switches 33. It also serves another function hereinafter to be described. When the drum assumes a position opposite to that shown in Fig. 7, it will be seen that when the motor again continues its rotation, the flow through the armature will be in the opposite direction and that the direction of rotation will therefore be reversed. This circuit can be traced as follows:

Current entering from the trolley passes through the resistance 92, the field coil on the motor 56, and the wire which connects the same with the contact F³. The current then passes through a segment 110 and out through contact A³, and it then passes through wire A⁶ and enters the terminal A⁵ on the armature, passing out through the opposite terminal A⁴ it enters contact A², which engages a segment 111. It then passes through this segment and out through contact G which is connected with the ground as shown. By tracing the shunting circuits through wire 97, it will be seen that the current flowing through these is also reversed. The cycle of operation in each instance will therefore be similar to those previously described, the only difference being that the current flow is reversed.

The main actuating drum carrying the helix is not provided with pins at terminal nor at intermediate return points and means must therefore necessarily be provided for imparting movement to the street displaying belts so that the proper street named may be displayed. The reversing switch is employed for this purpose and in such instances only serves one of the functions of the master switch, to-wit, that of opening the shunting circuits.

By referring to Fig. 7 it will be seen that the contacts K¹ and J² engage the contact 99 when the reversing switch assumes one position and that they will engage the contacts 130 and 131 when the position of the switch has been changed. By referring to the same figure it will be seen that there is a gap or break formed between the contact 99 and the contacts 130 and 131, and that the current flow through the contacts K¹ and J² will therefore be momentarily interrupted while the switch is changing position. The contacts K¹ and J² control the shunting circuit around the armature and as this circuit is momentarily broken during the movement of the switch, it is obvious that the current is temporarily permitted to flow through the armature of the motor. This is therefore started and movement is simultaneously transmitted to the display belt in the indicating machine, the movement imparted being sufficient to move the projections formed thereon out of engagement with the switch 80. The shunting circuit which was first momentarily opened is thereby permanently opened and it will remain open until the belt has travelled to display the proper street, and it will here be stopped due to the fact that the opposite projection 89 on the belt will now engage the contacts on the switch 81 and thereby close the shunting circuit in a normal manner. The reversing switch will in this manner perform one of the functions of the master switch or perform the same function as that of the pins on the helix and as no pins are provided at terminal or intermediate points, it is obvious that this special function is necessary.

From the foregoing description it can be seen that the automatic multiple switch controlling machine controls six circuits, three for each indicating machine and that the current flow through these circuits is reversed when the position of the reversing switch drum is changed; further the switches carried by the respective indicating machines and actuated by the projections on the respective belts serve the function of completing the shunting circuits established by the master switches 32 and 33, and that the function of the automatic multiple switch controlling machine is in reality that of positioning said master switches so that they either prepare the shunting circuits or open the same, said multiple switch controlling machine having still another function, to-wit, that of automatically reversing all circuits when the end of a run is reached, and that of functioning as a master switch at terminal or intermediate return points.

The multiple switch controlling machine really covers the subject matter of the present invention, but as its operation to a certain extent is dependent upon the switches 80 and 81, carried by the respective indicating machines, it is thought that their construction and operation should be described.

The indicating machines form the subject matter of a co-pending application, entitled "Indicator," said application being filed August 22, 1918, Serial No. 250,961. The present invention will therefore be limited to the automatic multiple switch controlling machine and the function of said machine when cooperating with the indicating machine; the specific structure of the indicators and other features involved being covered by the co-pending application.

Having thus described our invention, what we claim and desire to secure by Letters Patent is—

1. An automatic multiple switch controlling machine comprising a frame, a drum journalled therein, means for driving the drum, a helix formed on the surface of the drum, a plurality of projections on said helix, a rotor mounted adjacent the drum adapted to be engaged by the projections and intermittently rotated, a switch, and means actuated by the intermittent rotation of the rotor for changing the position of the switch.

2. An automatic multiple switch controlling machine comprising a frame, a drum journalled therein, means for driving the drum, a helix formed on the surface of the drum, a plurality of projections on said helix, a rotor mounted adjacent the drum adapted to be engaged by the projections and intermittently rotated, a shaft supporting the rotor, a key and feather on said shaft permitting longitudinal movement of the rotor with relation to the shaft, means on the rotor engaging the helix to transmit longitudinal movement to the rotor, and means actuated by the longitudinal movement of the rotor in either direction for automatically disengaging the driving means from the drum.

3. An automatic multiple switch controlling machine comprising a frame, a drum journalled therein, means for driving the drum, a helix formed on the surface of the drum, a plurality of projections on said helix, a rotor mounted adjacent the drum adapted to be engaged by the projections and intermittently rotated, a shaft supporting the rotor, a key and feather on said shaft permitting longitudinal movement of the rotor with relation to the shaft, means on the rotor engaging the helix to transmit longitudinal movement to the rotor, a drum mounted adjacent the rotor said drum carrying a reversing switch, and means for simultaneously reversing the position of the reversing switch when the first named drum is reversed.

4. An automatic multiple switch controlling machine comprising a frame, a drum journalled therein, means for driving the drum, a helix formed on the surface of the drum, a plurality of projections on said helix, a rotor mounted adjacent the drum adapted to be engaged by the projections and intermittently rotated, a shaft supporting the rotor, a key and feather on said shaft permitting longitudinal movement of the rotor with relation to the shaft, means on the rotor engaging the helix to transmit longitudinal movement to the rotor, means actuated by the longitudinal movement of the rotor in either direction for automatically disengaging the driving means for the drum, a pair of switches, and means actuated by the intermittent rotation of the rotor shaft for automatically changing the position of said switches.

5. In an automatic multiple switch controlling machine, a frame, a shaft journalled in said frame, means for driving the shaft in either direction, a drum turnably mounted on the shaft, a pair of driving members keyed to the shaft and turnable in unison therewith, said driving members being arranged on each side of the drum, a pair of driving members carried by the drum and engageable with the first named driving members, one of said driving members driving the drum when the shaft rotates in one direction and the other driving the drum when the shaft rotates in the opposite direction, a helix formed on the surface of the drum, a plurality of pins projecting from said helix, a shaft journalled in the frame adjacent the drum, a pin gear carried by said shaft engageable with the pins on the helix, said pin gear being flanged to engage the helix and to permit longitudinal movement of the pin gear on the shaft, and means on each side of the drum engageable with the pin gear and adapted to automatically break the driving connection between the drum and the shaft.

6. In an automatic multiple switch controlling machine, a frame, a shaft journalled in said frame, means for driving the shaft in either direction, a drum turnably mounted on the shaft, a pair of driving members keyed to the shaft and turnable in unison therewith, said driving members carried by the drum and engageable with the first named driving members, one of said driving members driving the drum when the shaft rotates in one direction and the other driving the drum when the shaft rotates in the opposite direction, a helix formed on the surface of the drum, a plurality of pins projecting from said helix, a shaft journalled in the frame adjacent the drum, a pin gear carried by said shaft engageable with the pins on the helix, said pin gear being flanged to engage the helix and to permit longitudinal movement of the pin gear on the shaft, means on each side of the drum engageable with the pin gear and adapted to automatically break the driving connection between the drum and the shaft, a cam member on one end of the pin gear supporting shaft and a pair of switch arms engaging the opposite sides thereof and adapted to be automatically swung from one position to another.

7. In an automatic multiple switch controlling machine a main frame, a shaft journalled therein, a drum turnably mounted on the shaft, a pair of ratchet gears keyed to the shaft and positioned one on each end of the drum, said ratchet gears being right and left hand, a right and left hand pawl carried by the drum, one on each side engaging the respective gears and forming a driving connection between the gears and the drum to permit the drum to be driven in either direction, a helix formed on the outer face of the drum, a plurality of pins projecting from the helix, a shaft journalled in the frame adjacent the drum, a pin gear carried by said shaft, a key and feather connection between the shaft and the pin gear permitting turning movement of the pin gear and shaft in unison and longitudinal movement of the pin gear on the shaft, means actuated by the helix for transmitting longitudinal movement to the pin gear, and means at each side of the drum engageable with the pin gear, and adapted to automatically release the pawls with relation to their respective ratchet gears to automatically break the driving connection between the shaft and the drum.

8. In an automatic multiple switch controlling machine a main frame, a shaft journalled therein, a drum turnably mounted on the shaft, a pair of ratchet gears keyed to the shaft and positioned one on each end of the drum, said ratchet gears being right and left hand, a right and left hand pawl carried by the drum, one on each side engaging the respective gears and forming a driving connection between the gears and the drum to permit the drum to be driven in either direction, a helix formed on the outer face of the drum, a plurality of pins projecting from the helix, a shaft journalled in the frame adjacent the drum, a pin gear carried by said shaft, a key and feather connection between the shaft and the pin gear permitting turning movement of the pin gear and shaft in unison and longitudinal movement of the pin gear on the shaft, means actuated by the helix for transmitting longitudinal movement to the pin gear, a rocker arm pivotally mounted on the frame, one on each side of the drum, a cam projection on each ratchet pawl and a projection on each rocker arm engageable with the pin gear when this travels longitudinally on its supporting shaft a predetermined distance, said rocker arm projection when engaged by the pin gear imparting a rocking movement to the adjacent rocker arm and thereby swinging it to a position where it will engage the ratchet pawl cam and automatically release the same.

9. In an automatic multiple switch controlling machine a main frame, a shaft journalled therein, means for rotating the shaft in either direction, a drum turnably mounted on the shaft, means keyed to the shaft and arranged on each end of the drum for transmitting rotary movement to the drum in either direction, said driving means being alternately operable, and manually operated means for rotating the shaft independent of the first named means.

10. In an automatic multiple switch controlling machine a main frame, a shaft journalled in the frame, a drum turnably mounted thereon, a driving connection formed between the shaft and the drum, power operated means connected with the shaft and adapted to rotate the same, manually operated means adapted to rotate the shaft independent of said power driving means, a helix on the drum, projections on said helix, a rotor adjacent the helix engageable with the projections and adapted to be intermittently rotated thereby, a pair of switches adapted to be intermittently operated by the intermittent rotation of the rotor, a reversing switch cooperable with the first named switches, and means for simultaneously changing the position of the reversing switch when the direction of rotation of the drum and supporting shaft is reversed.

11. In an automatic multiple switch controlling machine a main frame, a shaft journalled in the frame, a drum turnably mounted thereon, a driving connection formed between the shaft and the drum, power operated means connected with the shaft and adapted to rotate the same, manually operated means adapted to rotate the shaft independent of said power driving means, a helix on the drum, projections on said helix, a rotor adjacent the helix engageable with the projections and adapted to be intermittently rotated thereby, a pair of switches adapted to be intermittently operated by the intermittent rotation of the rotor, electric circuits controlled by said switches, a reversing switch cooperable with the first named switches, and means for automatically changing the position of the reversing switch when the direction of rotation of the drum and supporting shaft is reversed, said means being operable whether the drum shaft is rotated by the power actuated means or the manually controlled means.

12. An automatic multiple switch controlling machine comprising a frame, a drum journalled therein, means for driving the drum, a helix formed on the surface of the drum, a plurality of projections on said helix, a rotor mounted adjacent the drum adapted to be engaged by the projections and intermittently rotated thereby, a double throw switch, and means actuated by the intermittent rotation of the rotor for changing the position of the switch.

13. An automatic multiple switch controlling machine comprising a frame, a double throw switch mounted in the frame, a reversing switch mounted in the frame, a power driven actuator, projections on said actuator, means actuated by said projections for changing the position of the double throw switch, means permitting reversal of the power driven actuator, and means actuated by the reversal of said means for simultaneously changing the position of the reversing switch.

14. In an automatic multiple switch controlling machine a main frame, a shaft journalled therein, a drum turnably mounted on the shaft, a pair of ratchet gears keyed to the shaft and positioned one on each end of the drum, said ratchet gears being right and left hand, a right and left hand pawl carried by the drum, one on each side engaging the respective gears and the drum to permit the drum to be driven in either direction, a helix formed on the drum, interspaced projections on the helix, a pin gear adapted to be engaged and intermittently rotated thereby, and double throw switches adapted to be operated by the pin gear.

15. In an automatic multiple switch controlling machine a main frame, a shaft journalled therein, a drum turnably mounted on the shaft, a pair of ratchet gears keyed to the shaft and positioned one on each end of the drum, said ratchet gears being right and left hand, a right and left hand pawl carried by the drum, one on each side engaging the respective gears and the drum to permit the drum to be driven in either direction, a helix formed on the drum, interspaced projections on the helix, a pin gear adapted to be engaged and intermittently rotated thereby, a shaft supporting the pin gear and rotating in unison therewith, a cam member on the shaft, a pair of double throw switches, and means for transmitting movement from the cam member to actuate said switches.

In testimony whereof we have hereunto set our hands in the presence of two subscribing witnesses.

EVERETT A. MARGESON.
CHARLES D. HERROLD.

Witnesses:
F. S. PUNCH,
R. H. FRITSCH.